Figure 1:
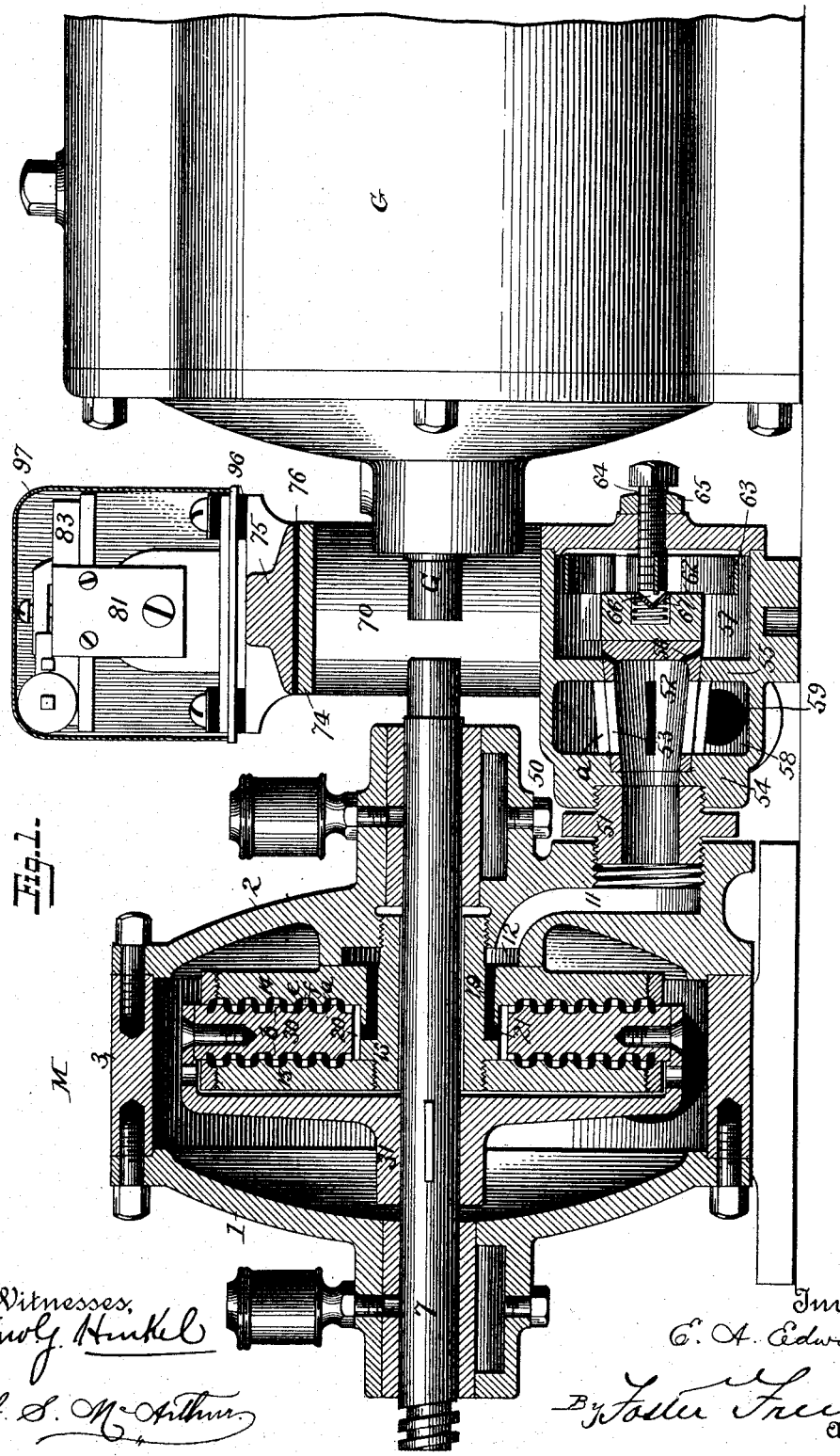

(No Model.)  2 Sheets—Sheet 1.

E. A. EDWARDS.
ELECTRIC AUTOMATIC STEAM GOVERNOR.

No. 504,492. Patented Sept. 5, 1893.

Witnesses.
Jwo. J. Hinkel
H. S. McArthur

Inventor
E. A. Edwards.
By Foster Freeman
Attorneys (No Model.) 2 Sheets—Sheet 2.
E. A. EDWARDS.
ELECTRIC AUTOMATIC STEAM GOVERNOR.
No. 504,492. Patented Sept. 5, 1893.
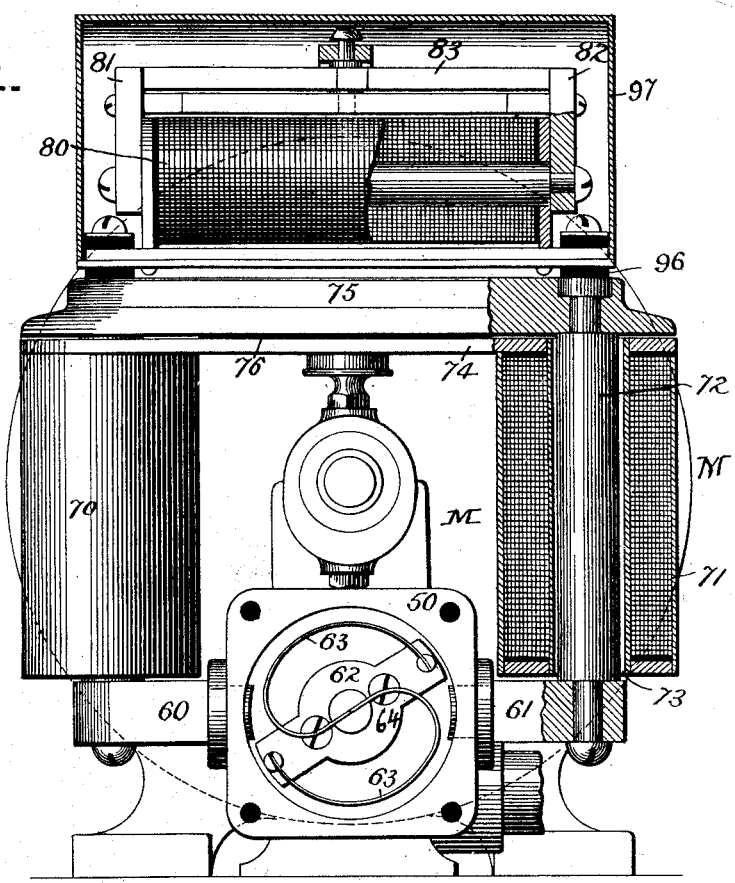
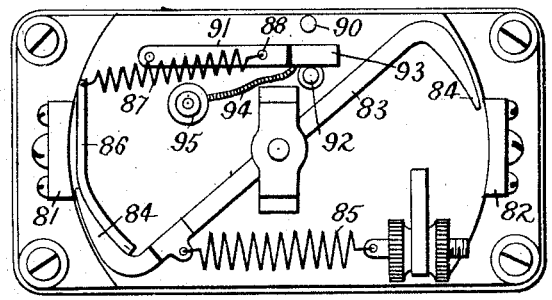
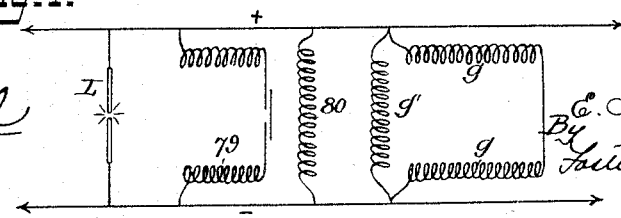
Witnesses
Inventor
E. A. Edwards.
By
Attorneys

UNITED STATES PATENT OFFICE.

EDGAR A. EDWARDS, OF CINCINNATI, OHIO.

ELECTRIC AUTOMATIC STEAM-GOVERNOR.

SPECIFICATION forming part of Letters Patent No. 504,492, dated September 5, 1893.

Application filed December 2, 1891. Serial No. 413,821. (No model.)

*To all whom it may concern:*

Be it known that I, EDGAR A. EDWARDS, a citizen of the United States, residing at Cincinnati, in the county of Hamilton and State of Ohio, have invented certain new and useful Improvements in Electric Automatic Steam-Governors, of which the following is a specification.

My invention relates to an electric automatic steam governor having the general features of construction and arrangement of parts, and adapted to be used for the purposes and objects, substantially as hereinafter more particularly pointed out.

One of the primary objects of this invention in connection with others, is to provide means for furnishing an electric current of comparatively high power by a simple, compact, cheap and economical apparatus, which may be used for various purposes, as for instance, in furnishing light for railway trains.

In order to carry out this general idea, it is necessary in the first place to provide an electric generator which shall be of comparatively small dimensions, and as it is well known in a generator of a given size and winding, the capacity of the output depends largely upon the rate of rotation of the armature, it is apparent that it is necessary to cause the armature of a generator of the style mentioned to rotate at a high rate of speed.

Further in carrying out the general objects in order to produce a compact, and simple device, it is expedient to connect a motor directly to the armature shaft, and do away with any belts, gears, or other intermediate connections between the motor and generator.

Further in order to attain a high rate of speed by means of a direct connection, under the circumstances indicated, it is required that the motor shall be small, and at the same time powerful, and capable of producing rapid rotation.

In order to carry out these general features of the invention, and at the same time to produce a plant of low initial cost and high efficiency, it is desirable to make use of a motor in which the power driving the motor is used to the best advantage. In furtherance of this idea, I prefer to use a steam motor having the general features of construction and mode of operation set forth in my application, Serial No. 412,650, filed November 21, 1891, by means of which the steam entering the motor is used expansively, and acts and re-acts on the stationary plates and the rotating wheel of the motor in an efficient and practical way to produce a high speed.

It is further desirable in order to produce the most economical result to provide means for governing the steam, or other fluid, supplied to the motor in accordance with the demands upon the current generated, or the work done thereby, and it is with this feature of this general system that my present invention has more particularly to do. It consists more especially in an automatic steam governor, electrically controlled to regulate the steam supplied to the motor in accordance with the strength of the current produced by the generator driven by the motor, the governor being preferably automatically controlled.

While I have shown the present invention as applied in connection with the general system above referred to, it is evident that the features of the invention in whole, or in part may be applied to other motors and systems without departing from the spirit of the invention, and I do not therefore limit myself to the precise arrangements and construction shown and described.

In order to more specifically point out the features of my invention, reference is made to the accompanying drawings, in which—

Figure 1, is a side view partially in section, showing an electric generator, a motor, and an electric automatic steam governor made in accordance with my invention, and applied thereto. Fig. 2, is a partial vertical, transverse, sectional view of Fig. 1 showing the governing device. Fig. 3, is a plan view showing the electric switch or cut-out controlling the governor. Fig. 4, is a diagram of one arrangement of circuits.

In the drawings, G represents an electric generator which may be of any desired type, and which is mounted upon a suitable base, and is provided with an armature shaft G' extending horizontally, and adapted to be directly connected to the shaft, of a motor M, which motor is also preferably mounted upon the same base with its shaft concentric with the armature shaft of the generator, the two shafts being connected in any suitable and well known way. While any suitable motor having a high rate of speed may be used, I have shown as a preferable construction, a vertical section of a steam motor made in accordance with the subject matter of my previous application before referred to, and while it is not necessary herein to describe in detail the features of construction of the motor, it may be said that it consists essentially of two plates 14 and 15 mounted within a casing 1, 2, and 3 preferably upon a sleeve 16, which surrounds the shaft 7 of the motor. Mounted on said shaft is a carrier 31, supporting a wheel 30, which is arranged to rotate between the plates 14 and 15, the adjacent sides of the plates and the wheel being provided with a series of grooves $a$, $e$, and intermediate rings $b$, $f$, arranged in proper relation to each other to form a passage for the steam from the steam chest 21 outwardly toward the peripheries of the ring and disks, the steam being allowed to work expansively as it passes through the grooves in a manner clearly set forth in my said application, and thereby causing the wheel 30 and its attached shaft to rotate at a high rate of speed, and to utilize the steam in an effective and economical manner. The steam is supplied to the motor by a suitable inlet 11 whence it passes into the chamber 12, and thence by the passages 19 to the steam chest 21 and through the grooves in the plates 14 and 15 and wheel 30 to the chamber of the case 1, 2, and out to the exhaust port.

Connected to control the steam passing to the inlet 11 of the motor, is the automatic steam governor forming the particular features of my present invention, and I have shown it as consisting of a valve case 50 which is united to the inlet 11 by right and left hand couplings 51. This valve case is provided with a suitable valve 52 shown in the present instance as a taper valve having inlets or slots 53 on opposite sides and being ground, so as to accurately fit its bearings in the end 54 and the partition 55 of the case. The valve is further provided with passages 56 opening into the rear chamber 57 of the case, while the openings 53 communicate with the main steam chamber 58 having an inlet port 59 through the openings 53ª in the partition or web 50ª of the case. In this way, it will be seen that the valve is accurately balanced in its seat, and requires no packing or stuffing boxes, while it is free to turn under pressure of the steam, the passages 56 allowing the pressure in the chamber 57 to vary in accordance with the variations of the pressure in the chamber 58, and as a consequence the valve can be readily moved. In order to move the valve automatically, I preferably provide means operating by the aid of electricity or magnetism which may be controlled by the current of the generator and rock or shift the valve in accordance with the strength of the current generated.

While various electrical or magnetic means can be used, I have shown the valve case 50, as being provided with pole pieces of electro-magnets 60, 61, these pole pieces being fitted into the case 50, which is preferably of brass or other non-magnetic material, so as to project into the chamber 57 a short distance, and be secured therein tightly, without the use of stuffing boxes or other appliances.

Mounted upon the valve 52 is a plate 62 of magnetic material, acting as an armature to the poles 60 and 61, and this armature is biased or under the stress of a spring, so as preferably to normally hold the parts of the valve 52 open, and I have shown a spring or springs 63 mounted in an adjustable screw 64, passing through the head of the case 50, and being provided with a suitable jam nut 65, by means of which it can be secured when adjusted, the other ends of the springs 63 being connected to the armature plate 62. The screw 64 not only provides a support for the springs, but is preferably made with a tapered end 66, which fits against the conical shaped socket 67, which is spring supported in a recess in the armature which is attached to the head of the valve, and in this way the valve is securely held in position in its seat.

The poles 60 and 61 are attached to the cores of the electro-magnets 70 and 71, the coils surrounding these cores are preferably arranged to provide against injury from the heat which may be transmitted from the valve case to the cores through the poles. In doing this, I so mount the spools or coils 72 as to leave an air space 73 between the cores and spools. I further attach the coils to a plate 74, which may be of brass or similar material, and secure this plate to the neutral yoke piece 75 through the medium of some material which is a poor conductor of heat, and I have shown sheets or pieces of asbestus 76 interposed between the parts, and in this way, the coils will not become overheated in a manner to interfere with their proper operation. These magnets 70 and 71 are as before intimated preferably energized to operate the valve from the current from the generator, and in order that they may be automatically operated in accordance with variations in the strength of the current of the generator, I provide a controller, consisting essentially of an electro-magnet 80, the coils of which are connected in the circuit from the generator. This magnet in the form shown in the drawings, is provided with extended pole pieces 81, 82, and mounted above the magnet is an armature 83 preferably having extended and curved polar projections 84 arranged in proper relation to the polar projections of the magnet. This armature is biased or under tension of a suitable spring 85, provided with the usual adjusting means, so that in its normal position, the polar projections of the armature occupy a position away from the polar extensions of the magnet as indicated in Fig. 3, the tension of the spring being sufficient to maintain the armature in this position against the attractive force of the polar extension of the magnet under a current of a given strength.

Suitably mounted with relation to the magnet is the contact piece 90, forming one terminal of the circuit of the magnets 70, 71, while the other terminal is connected to a pivoted arm 91, a stop pin 92 being arranged adjacent the contact 90, and between which pin and contact, the arm 91 may vibrate. This arm 91 is preferably made of insulating material, and carries at its end a piece 93 of conducting material, such as carbon, and is connected to the circuit by a flexible conductor 94 leading to a binding post 95. Suitable means are provided to operate this arm 91 in accordance with the movements of the arm 83, and I have shown one of the polar extensions 84 of the armature as being provided with an arm 86 to which is attached the spring 87, the other end of the spring being secured to the arm 91, as at a point 88, the arrangement being such that when the armature is in the position shown in Fig. 3 the circuit of the magnets 70, 71 will be opened between the arm 91 and the contact 90, and the tendency of the spring 87 is to maintain these parts in position. When, however, the current in the magnet 80 is increased, the poles of this magnet will operate to overcome the tendency of spring 85, and cause the armature to swing, and as a consequence, the arm 86 is carried around, so that the spring 87 moves over the pivot point of the arm 91, and the spring will withdraw said arm 91 from the stop 92, thus closing the circuit of the magnets 70, 71. The current passing through the coils of the magnets 70, 71, energizes the polar extensions 60, 61, which acting upon the armature 62 connected to the valve 52, causes it to rotate against the tension of the spring 63, and to shut off the steam passing through the valve into the motor. As long as the magnets are so energized, the steam will be cut off. This allows the steam passing through the motor to operate expansively, and to be utilized in the most economical manner. When, however, the motor slows up under the cut off steam, the strength of the current of the generator falls, and the magnet 80 is energized to a less extent, allowing the spring 85 to retract the armature, so as to move the arm 91 from the contact 90 to the stop 92, thus breaking the circuit of the magnets 70, 71. As a consequence, the armature 62 is rotated under the stress of a spring 63 to open the valve, and allow the steam to flow to the engine, and these operations are continued, being automatic and depending upon the strength of the current generated, and passing through the coils of the magnet 80. As a matter of practice, these variations depend upon the work done in the circuit of the generator, and as the work done, (as for instance when an arc lamp or lamps are connected in the circuit) is constantly varied, the strength of the working circuit is varied, and consequently the magnet 80 is energized to a greater or less degree in accordance with the variations in the working circuit. This in turn operates to make and break the circuit of the magnets 70 and 71, and to move the valve 52 to open and close it in accordance with the requirements of the load. From this it will be seen that the supply of steam to the motor is automatically controlled, so that an excess of steam will not be used, and further as the flow of steam is interrupted completely at intervals, the steam is allowed to operate expansively in the motor, and transmit a greater proportion of its energy to the motor, resulting in great economy, and at the same time maintaining the speed of the motor practically constant, although it will vary to a slight extent. As before intimated, when it is running at a high speed, a slight variation will produce a sufficient change in the strength of the current generated to cause the valve to be opened or closed instantaneously through the electrical connections, to supply or cut off the steam. It will further be seen that when the parts are properly adjusted and running under normal conditions, a very slight increase or decrease in the strength of the current will instantaneously operate the valve in accordance therewith, and it follows that the smallest possible quantity of steam necessary to maintain the operation of the motor at its proper speed is supplied thereto, and is utilized under the most favorable conditions to the end that great economy of steam is attained. This controlling magnet 80 may be located at any desired position with relation to the valve, but in the construction shown, I have conveniently located it on top of the yoke piece 75 of the magnets 70, 71, and have insulated it therefrom both electrically and calorically by insulating material 96, and have preferably inclosed it in a case 97, although it is evident that these details of construction are immaterial to the general features of the invention.

In the diagram Fig. 4, I have indicated an arrangement of circuits in which $g$ are the field coils of the generator G shown in shunt from the armature $g'$, while the leading wires, plus and minus representing the working circuit in which there are translating devices, represented by the lamp L. Also connected in multiple circuit with the leading wires, are the coils of the magnet 80, the armature of which controls the circuit of the valve operating magnets 70, 71, the circuits being in multiple arc, and the variations depending upon variations in the electro motive force of the generator. It is evident, however, that the same arrangement of devices, and same effect may be produced by controlling the valve through variations in ampèrage of the circuit coils of the generator, the circuit being suitably arranged. From this arrangement it is evident that I secure the well-known advantages following the initial use of steam at boiler pressure, in that a high initial pulsation is applied directly to the motor, and the steam is allowed to operate expansively, exerting its full force on the motor. Further, by cutting off the steam absolutely and instantaneously when the motor runs a little faster than necessary, I reduce the amount of steam to the smallest degree, enabling me to produce a comparatively high efficiency from the least amount of evaporated water, and by having the steam thus controlled automatically by means of the electric current, the slight variations in the speed of the motor can be utilized to instantaneously control the flow of steam, while the motor is maintained at a practically uniform rotation.

The valve it will be seen is normally held open under the stress of a spring, and as the magnets are energized, it is quickly closed in a manner to prevent wire drawing, and loss of pressure, and again as quickly opened as the conditions of the working circuit may require.

While I have described my invention as adapted to open and close the valve to the full extent under variations in the working circuit, it is evident that the coils of the magnets 70, 71, might be included directly in the electric circuit, and operate upon the armature connected to the valve instantaneously as to throttle the steam passing through the valve to a greater or less extent in accordance with the current through the magnet. While this would not involve all the advantages of the automatic governor as above described, it would be a means of automatically controlling the steam by a direct throttling in accordance with the strength of the current in the magnets.

What I claim is—

1. The combination with a generator and motor therefor, of an electric automatic steam governor, the valve of which is normally completely opened, electrical devices connected with the generator for controlling the valve and means for instantly completely closing the valve when released by the electrical devices, substantially as described.

2. An electric automatic steam governor provided with a valve, devices for holding the valve normally completely open and means for instantly completely closing the valve, substantially as described.

3. An electric automatic steam governor comprising a valve case, a balance rocking valve therein, mechanical means for rocking the valve in one direction, and electro-magnets, the poles of which project through the valve casing and are arranged to rock the valve in the other direction, substantially as described.

4. An electric automatic steam governor consisting of a case, a balance rocking valve within the case, an armature connected rigidly to the stem of the rocking valve, mechanical means for rocking the valve in one direction, and magnets, the poles of which project through the sides of the case for rocking the valve in the opposite direction, substantially as described.

5. An electric automatic steam governor comprising a valve case, a balance rocking valve within the case, an armature attached rigidly to the valve, springs for moving the armature in one direction, and magnets, the poles of which extend through the sides of the case for moving the armature in the other direction, substantially as described.

6. An electric automatic steam governor comprising a case and a valve therein, an armature controlling the valve, a magnet controlling the armature, the coils of the magnet being insulated calorically, substantially as described.

7. The combination with the valve casing and valve therein, an armature for operating the valve, magnets for operating the armature, the coils of the magnets being mounted upon the cores in the manner to provide an air space between the cores and coils, substantially as described.

8. The combination with an electrically controlled valve, of a magnet for operating the valve, the coils of the magnet being mounted on a plate, and calorically insulated from the yoke and core, substantially as described.

9. The combination with a balance valve and magnet controlling the valve, the armature of the magnet being directly connected to the valve plug of a controller for the magnet comprising a magnetic switch arranged to open and close the circuit of the magnet to completely open or close the valve, substantially as described.

10. The combination with the electric automatic steam governor, having a valve adapted to be opened to its fullest extent or completely closed, and not occupy any intermediate position between the two extremes, of a controller therefor consisting of a magnet, an armature, a switch arm connected to the armature and controlling the circuit of the governor, and connections between the switch and armature for opening and closing the switch in accordance with variations in the circuit of the magnet, substantially as described.

In testimony whereof I have signed my name to this specification in the presence of two subscribing witnesses.

EDGAR A. EDWARDS.

Witnesses:
R. S. DONALDSON,
F. L. FREEMAN.